(12) United States Patent
Mori et al.

(10) Patent No.: US 11,415,499 B2
(45) Date of Patent: Aug. 16, 2022

(54) PARTICLE SIZE DISTRIBUTION MEASUREMENT DEVICE AND PROGRAM FOR A PARTICLE SIZE DISTRIBUTION MEASUREMENT DEVICE

(71) Applicant: HORIBA, LTD., Kyoto (JP)

(72) Inventors: Tetsuya Mori, Kyoto (JP); Hirosuke Sugasawa, Kyoto (JP); Keijiro Sakuramoto, Kyoto (JP); Tetsuji Yamaguchi, Kyoto (JP)

(73) Assignee: HORIBA, LTD., Kyoto (JP)

( * ) Notice: Subject to any disclaimer, the term of this patent is extended or adjusted under 35 U.S.C. 154(b) by 714 days.

(21) Appl. No.: 16/461,539

(22) PCT Filed: Oct. 6, 2017

(86) PCT No.: PCT/JP2017/036468
§ 371 (c)(1),
(2) Date: May 16, 2019

(87) PCT Pub. No.: WO2018/092462
PCT Pub. Date: May 24, 2018

(65) Prior Publication Data
US 2019/0353571 A1 Nov. 21, 2019

(30) Foreign Application Priority Data

Nov. 17, 2016 (JP) .............................. JP2016-224101

(51) Int. Cl.
*G01N 15/10* (2006.01)
*G01N 15/02* (2006.01)

(52) U.S. Cl.
CPC ..... *G01N 15/0211* (2013.01); *G01N 15/0272* (2013.01); *G01N 15/10* (2013.01); *G01N 2015/1087* (2013.01)

(58) Field of Classification Search
CPC .............. G01N 15/0211; G01N 15/10; G01N 2015/1087
See application file for complete search history.

(56) References Cited

U.S. PATENT DOCUMENTS

2016/0238510 A1* 8/2016 Bachalo ............. G01N 15/1429

FOREIGN PATENT DOCUMENTS

| JP | 03-195950 A | 8/1991 |
|---|---|---|
| JP | 2000-046719 A | 2/2000 |

(Continued)

OTHER PUBLICATIONS

International Search Report dated Jan. 16, 2018 for International Application No. PCT/JP2017/036468 and English translation.

*Primary Examiner* — Thanh Luu
(74) *Attorney, Agent, or Firm* — Lucas & Mercanti, LLP

(57) ABSTRACT

The particle size distribution measurement device irradiates light onto a sample of particles, then detects secondary light generated by this irradiation, and then calculates a particle size distribution of the particles based on the detection data, and includes a separate measurement data receiving unit that receives separate measurement data obtained by separately measuring particles having a specific particle size in a separate sample, and light intensity data showing a light intensity of the secondary light generated by the particles in the separate sample, and a distribution conversion unit that, based on the separate measurement data and on the light intensity data, converts the particle size distribution from a distribution in which the numbers of particles of each particle size contained in the sample being measured are shown in relative terms to a distribution in which the numbers of these particles are shown in absolute terms.

7 Claims, 8 Drawing Sheets

(56) References Cited

FOREIGN PATENT DOCUMENTS

| JP | 2007-263876 A | 10/2007 |
| JP | 2008-122208 A | 5/2008 |
| JP | 2009-216575 A | 9/2009 |

* cited by examiner

PARTICLE SIZE DISTRIBUTION MEASUREMENT DEVICE AND PROGRAM FOR A PARTICLE SIZE DISTRIBUTION MEASUREMENT DEVICE

CROSS REFERENCE TO RELATED APPLICATION

This Application is a 371 of PCT/JP2017/036468 filed on Oct. 6, 2017 which, in turn, claimed the priority of Japanese Patent Application No. 2016-224101 filed on Nov. 17, 2016, both applications are incorporated herein by reference.

TECHNICAL FIELD

The present invention relates to a particle size distribution measurement device, and to a program for a particle size distribution measurement device.

TECHNICAL BACKGROUND

Conventionally, as is shown in Patent Document 1, a particle size distribution measurement device is known that irradiates light onto particles contained in an object being measured, then detects secondary light generated by this irradiation, and then calculates the particle size distribution of the particles based on the detection data.

The particle size distribution calculated by this particle size distribution measurement device is displayed on a graph showing what proportion of the total particles is formed by particles having a particular particle size, with one axis showing the particle size and the other axis showing the percentage. In other words, this particle size distribution shows, for a particular particle size shown on the one axis, the relative particle number of particles having that particle size.

In recent years, a desire has arisen to understand a correlation between an absolute particle number of particles contained in an object being measured, and, for example, an effect obtained from that object being measured. Consequently, there is a need to be able to measure absolute particle numbers such as the number of particles per unit volume (i.e., a number density) of an object being measured. Note that the term 'absolute' used here means that the actual number of particles matches to the required accuracy (for example, to the same number of digits), and is not restricted to meaning that the actual number of particles matches perfectly.

One method used to measure an absolute particle number involves counting particles in an object being measured using a microscope or the like, however, in order to obtain a broader measurement range using this method, it is necessary to use multiple types of instruments such as optical microscopes and electron microscopes that are each suitable for counting mutually different sizes, so that the measurement process is extremely time-consuming.

DOCUMENTS OF THE PRIOR ART

Patent Documents

[Patent Document 1] Japanese Unexamined Patent Application (JP-A) No. 2008-122208

DISCLOSURE OF THE INVENTION

Problems to be Solved by the Invention

The present invention was conceived in view of the above-described circumstances, and it is a principal object thereof to provide a particle size distribution measurement device that is capable of measuring easily, and over a wide range, an absolute number of particles contained in an object being measured at a required accuracy.

Means for Solving the Problem

In other words, a particle size distribution measurement device according to the present invention is a particle size distribution measurement device that irradiates light onto a particles serving as an object being measured, then detects secondary light generated by this irradiation, and then calculates a particle size distribution of the particles based on the detection data, and that includes a separate measurement data receiving unit that receives separate measurement data obtained by separately measuring a number of particles having a specific particle size that are contained in a separate sample from the object being measured, and light intensity data showing a light intensity of the secondary light generated by the particles having the specific particle size that is detected as a result of the light being irradiated onto the separate sample, and a distribution conversion unit that, based on the separate measurement data and on the light intensity data, converts the particle size distribution from a distribution in which the numbers of particles of each particle size contained in the object being measured are shown in relative terms to a distribution in which the numbers of these particles are shown in absolute terms.

According to the particle size distribution measurement device which is formed in the above-described manner, by separately measuring the number of particles having a specific particle size that are contained in a separate sample from the object being measured, and the light intensity of the secondary light generated by the particles having this specific particle size, it is possible to convert the particle size distribution in the object being measured from a distribution in which the numbers of particles of each particle size are shown in relative terms to a distribution in which the numbers of these particles are shown in absolute terms. As a result, it is possible to measure easily, and over a wide range, an absolute number of particles contained in an object being measured at a required accuracy without using multiple types of instruments such as optical microscopes and electron microscopes.

It is preferable that there be further provided a correlation data storage unit that stores particle number—light intensity correlation data that shows a correlation between the number of particles shown by the separate measurement data, and the light intensity shown by the light intensity data.

If this type of structure is employed, it becomes possible to convert a particle size distribution using particle number—light intensity correlation data stored in a correlation data storage unit, and because there is no need to make separate measurements each time an object being measured changes, a reduction in the measurement time can be achieved.

If diffracted/scattered light is detected as the secondary light, the configuration of the light intensity distribution of this diffracted/scattered light changes in accordance with the refractive index of the object being measured. Because of this, if the refractive index of an object being measured is different from the refractive index of a separate sample, if the particle size distribution of an object being measured is converted using unmodified particle number—light intensity correlation data obtained by separately measuring a separate sample, there is a possibility that there will be a considerable mismatch between the number of particles shown by the converted particle size distribution and the actual number of particles.

For this reason, it is preferable that the secondary light be diffracted/scattered light, and that the distribution conversion unit convert the particle size distribution in the object being measured from a distribution in which numbers of particles are shown in relative terms to a distribution in which numbers of particles are shown in absolute terms using the particle number—light intensity correlation data, and using a refractive index of the object being measured and a refractive index of the separate sample.

If this type of structure is employed, then even if the refractive index of an object being measured and the refractive index of a separate sample are mutually different from each other, because it is possible to convert the particle size distribution of the object being measured into a distribution in which the number of particles is shown in absolute terms while considering both these refractive indexes, any difference between the number of particles shown in the converted particle size distribution and the actual number of particles can be reduced.

A specific example of an object being measured is foam particles contained in a liquid.

In addition, a program for a particle size distribution measurement device according to the present invention is a program that is instilled in a particle size distribution measurement device that irradiates light onto a particles serving as an object being measured, then detects secondary light generated by this irradiation, and then calculates a particle size distribution of the particles based on the detection data, wherein the program causes a computer to perform functions of a separate measurement data receiving unit that receives separate measurement data obtained by separately measuring a number of particles having a specific particle size that are contained in a separate sample from the object being measured, and light intensity data showing a light intensity of the secondary light generated by the particles having the specific particle size that is detected as a result of the light being irradiated onto the separate sample, and of a distribution conversion unit that, based or the separate measurement data and on the light intensity data, converts the particle size distribution from a distribution in which the numbers of particles of each particle size contained in the object being measured are shown in relative terms to a distribution in which the numbers of these particles are shown in absolute terms.

According to this type of program for a particle size distribution measurement device, it is possible to achieve the same type of operation and effects as those obtained from the above-described particle size distribution measurement device.

Furthermore, a particle size distribution measurement device according to the present invention is a particle site distribution measurement device that irradiates light onto a particles serving as an object being measured, then detects secondary light generated by this irradiation, and then calculates a particle size distribution of the particles based on the detection data, and that includes a separate measurement data receiving unit that receives separate measurement data obtained by separately measuring a number of particles having a specific particle size that are contained in the object being measured, and a distribution conversion unit that, based on the separate measurement data, converts the particle size distribution from a distribution in which the numbers of particles of each particle size contained in the object being measured are shown in relative terms to a distribution in which the numbers of these particles are shown in absolute terms.

In addition, a program for a particle size distribution measurement device according to the present invention is a program that is installed in a particle size distribution measurement device that irradiates light onto a particles serving as an object being measured, then detects secondary light generated by this irradiation, and then calculates a particle size distribution of the particles based on the detection data, wherein the program causes a computer to perform functions of a separate measurement data receiving unit that receives separate measurement data obtained by separately measuring a number of particles having a specific particle size that are contained in the object being measured, and of a distribution conversion unit that, based on the separate measurement data and on the light intensity data, converts the particle size distribution from a distribution in which the numbers of particles of each particle size contained in the object being measured are shown in relative terms to a distribution in which the numbers of these particles are shown in absolute terms.

According to a particle size distribution measurement device which is formed in the above-described manner, and to a program for a particle size distribution measurement device which is configured in the above-described manner, by separately measuring the number of particles having a specific particle size that are contained in an object being measured, it is possible to convert the particle size distribution in the object being measured from a distribution in which the numbers of particles of each particle size are shown in relative terms to a distribution in which the numbers of these particles are shown in absolute terms, and it becomes possible to measure easily, and over a wide range, an absolute number of particles contained in an object being measured at a required accuracy.

Effects of the Invention

According to the present invention which is formed in the above-described manner, it is possible to measure easily, and over a wide range, an absolute number of particles contained in an object being measured.

DESCRIPTION OF THE REFERENCE NUMERALS

100 ... Particle Size Distribution Measurement Device
X ... Object Being Measured
21 ... Light Intensity Distribution Acquisition Unit
22 ... Particle Size Distribution Calculation Unit
23 ... Separate Measurement Data Receiving Unit
24 ... Distribution Conversion Unit
25 ... Correlation Data Correction Unit

BEST EMBODIMENTS FOR IMPLEMENTING THE INVENTION

Hereinafter, an embodiment of a particle size distribution measurement device according to the present invention will be described with reference to the drawings.

A particle size distribution measurement device 100 according to the present embodiment is what is known as a laser diffraction/scatter-type of particle size distribution measurement device that measures a particle size distribution by utilizing the fact that a light intensity distribution that corresponds to a spread angle of the diffracted/scattered light which is generated when light is irradiated onto particles is determined by the size of the particles using MIE scattering theory and Fraunhofer diffraction theory and the like, and detecting this diffracted/scattered light. Examples of an object X being measured include pharmaceuticals, food products, and chemical industry products and the like, however, here, foam particles contained in a liquid are used for the object X being measured.

Figure 1:
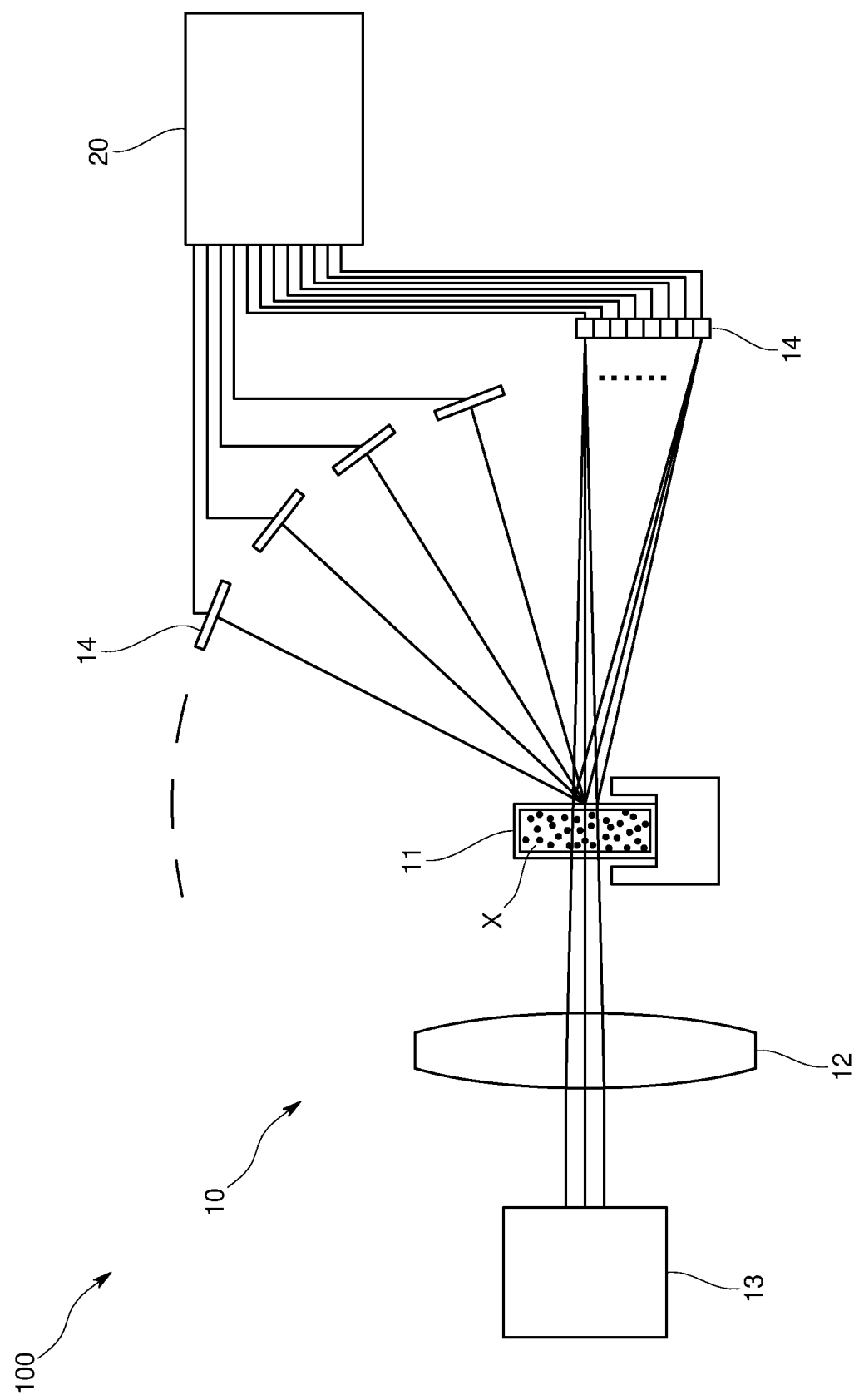
FIG. 1 is a schematic view showing a particle size distribution measurement device according to an embodiment of the present invention.

As is shown in a typical view in FIG. 1, the particle size distribution measurement device 100 is provided with a device main body 10 and a computation device 20.

The device main body 10 is provided with a cell 11 that contains a particles which is serving as the object X being measured, a laser device formed by a light source 13 that irradiates laser light via a lens 12 onto the particles inside the cell 11, and a plurality of photodetectors 14 that detect the light intensity of the diffracted/scattered light generated by the laser light irradiation in accordance with the spread angle thereof.

Note that, in the present embodiment, a batch-type cell is used for the cell 11, however, a circulatory-type cell may be used instead.

The computation device 20 is formed, in physical terms, by a general-purpose or dedicated computer that is provided with a CPU, memory, an input/output interface and the like, and receives light intensity signals output from the respective photodetectors 14 which it then uses to calculate a particle size distribution.

Figure 2:
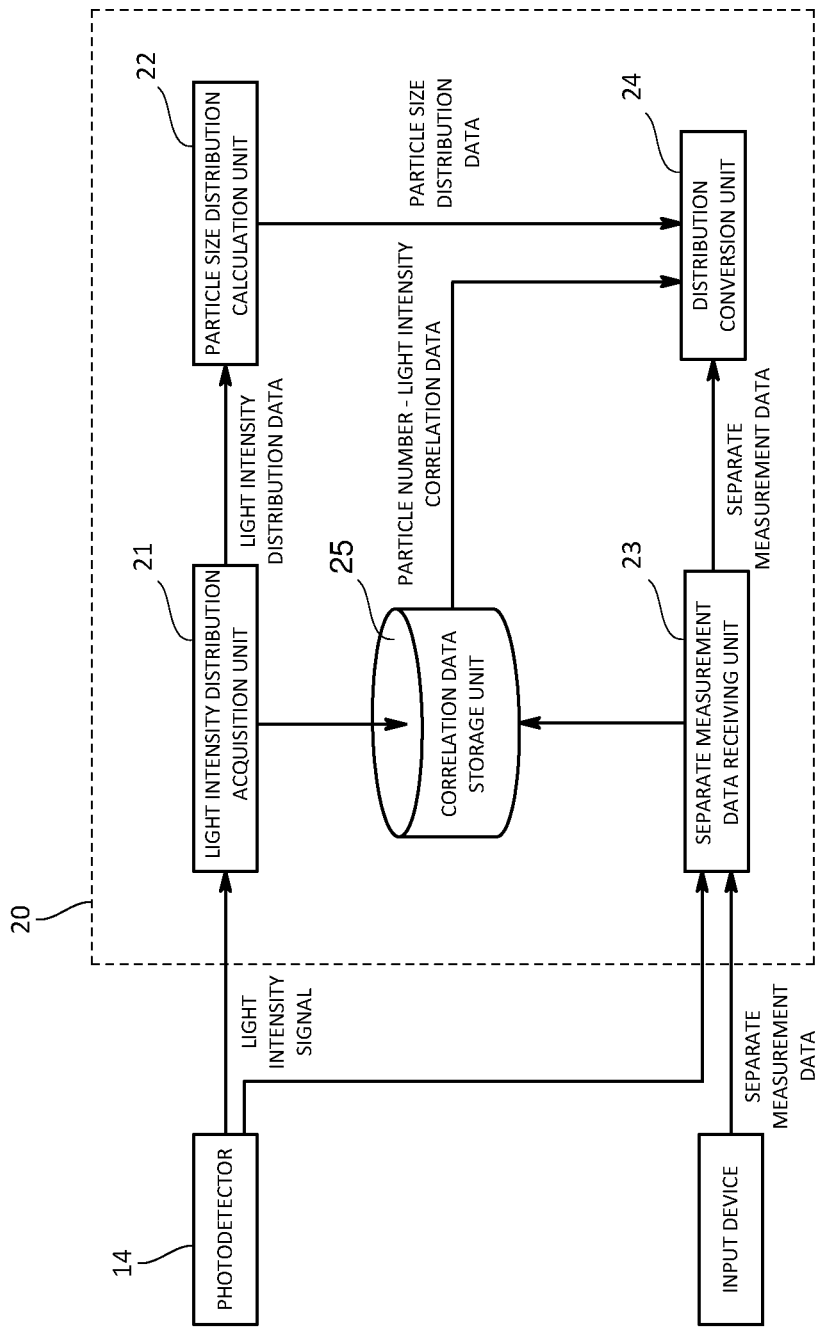
FIG. 2 is a function block diagram showing a function structure of a computation device according to the same embodiment.

As is shown in FIG. 2, this computation device 20 is provided with functions of a light intensity distribution acquisition unit 21 and a particle size distribution calculation unit 22. The computation device 20 achieves these functions by causing the CPU and peripheral devices to operate in mutual collaboration in accordance with a predetermined program which is stored in a predetermined area of the memory.

Figure 3:
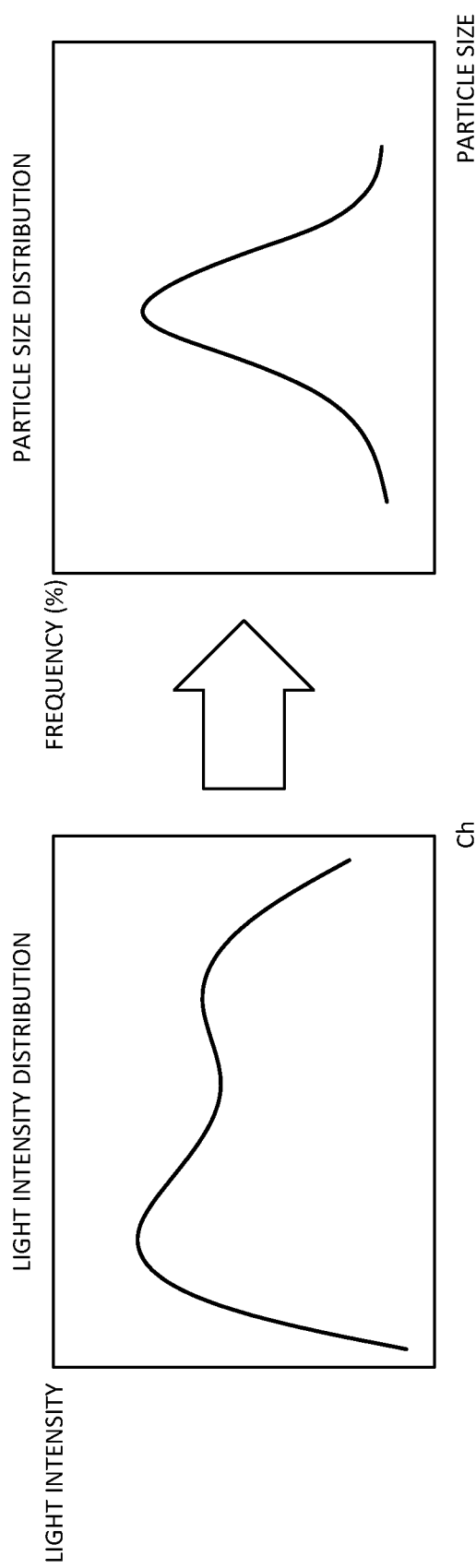
FIG. 3 is a typical view illustrating a light intensity distribution and a particle size distribution according to the same embodiment.

The light intensity distribution acquisition unit 21 receives light intensity signals output from the respective photodetectors 14, and acquires light intensity distribution data that, as is shown in FIG. 3, shows the light intensity distribution in the channels of the respective photodetectors 14, namely, the light intensity distribution for the spread angles of the diffracted/scattered light.

The particle size distribution calculation unit 22 calculates particle size distribution data that shows the particle size distribution of the particles forming the object X being measured based on the light intensity distribution data acquired by the tight intensity distribution data acquisition unit 21.

As is shown in FIG. 3, this particle size distribution shows the proportion of the entire particle swarm occupied by particles having a particular particle size (hereinafter, this may also be referred be to as the frequency), and is expressed on a graph of which one axis is set to the particle size, and the other axis is set to the frequency. Here, the frequency is shown as a percentage, in other words, the particle size distribution can be said to show in relative terms the number of particles of each particle size.

In this way, as is shown in FIG. 2, the computation device 20 of the present embodiment is further provided with the functions of a separate measurement data receiving unit 23, a distribution conversion unit 24, and a correlation data storage unit 25.

The separate measurement data receiving unit 23 receives separate measurement data obtained by separately measuring the number of particles having a specific particle size that are contained in a separate sample from the object X being measured (hereinafter, this may also be referred to simply as a 'separate sample'), and also receives light intensity data that shows a light intensity of secondary light generated by the particles having the specific particle size that is detected when light is irradiated onto the separate sample.

The separate measurement data is formed by results obtained by measuring the number of particles having a specific particle size using a separate measurement device without using the particle size distribution measurement device 100 of the present invention such as, for example, a microscope such as am SEM and TEM, or a particle number measurement device known as a Coulter counter that employ the Coulter principle. Here, the separately measured results can be input by a user via, for example, an input device, and the separate measurement data showing these input separately measured results is transmitted to the separate measurement data receiving unit 23.

Examples of the input separate measurement data include the number of particles having a specific particle size (i.e., the number density) contained per unit volume, the total number of particles having a specific particle size contained in the entire separate sample, and the turbidity or volumetric density of particles having a specific particle size that are contained in the separate sample.

Note that the 'particles having a specific particle size' referred to here are not limited to particles having a particular particle size (for example, 500 nm), and may also be particles whose particle size is contained within a specific range (for example, 450 nm to 550 nm).

The light intensity data is data showing the light intensity of diffracted/scattered light detected when light is irradiated onto a separate sample. In the present embodiment, a light intensity signal detected by the photodetectors 14 when light is irradiated from the light source 13 is used for the light intensity data.

More specifically, a photodetector 14 that detects diffracted/scattered light generated by the aforementioned particles having a specific particle size is taken as a specific channel Cx, and a light intensity signal showing at least the light intensity detected fay this specific channel Cx (in other words, the light intensity of a specific spread angle) is transmitted to the separate measurement data receiving unit 23.

Note that it is not essential that the light intensity data be detected using the photodetectors 14 provided in the particle size distribution measurement device 100 of the present embodiment, and may instead be data that is detected by a separate photodetector.

Figure 4:
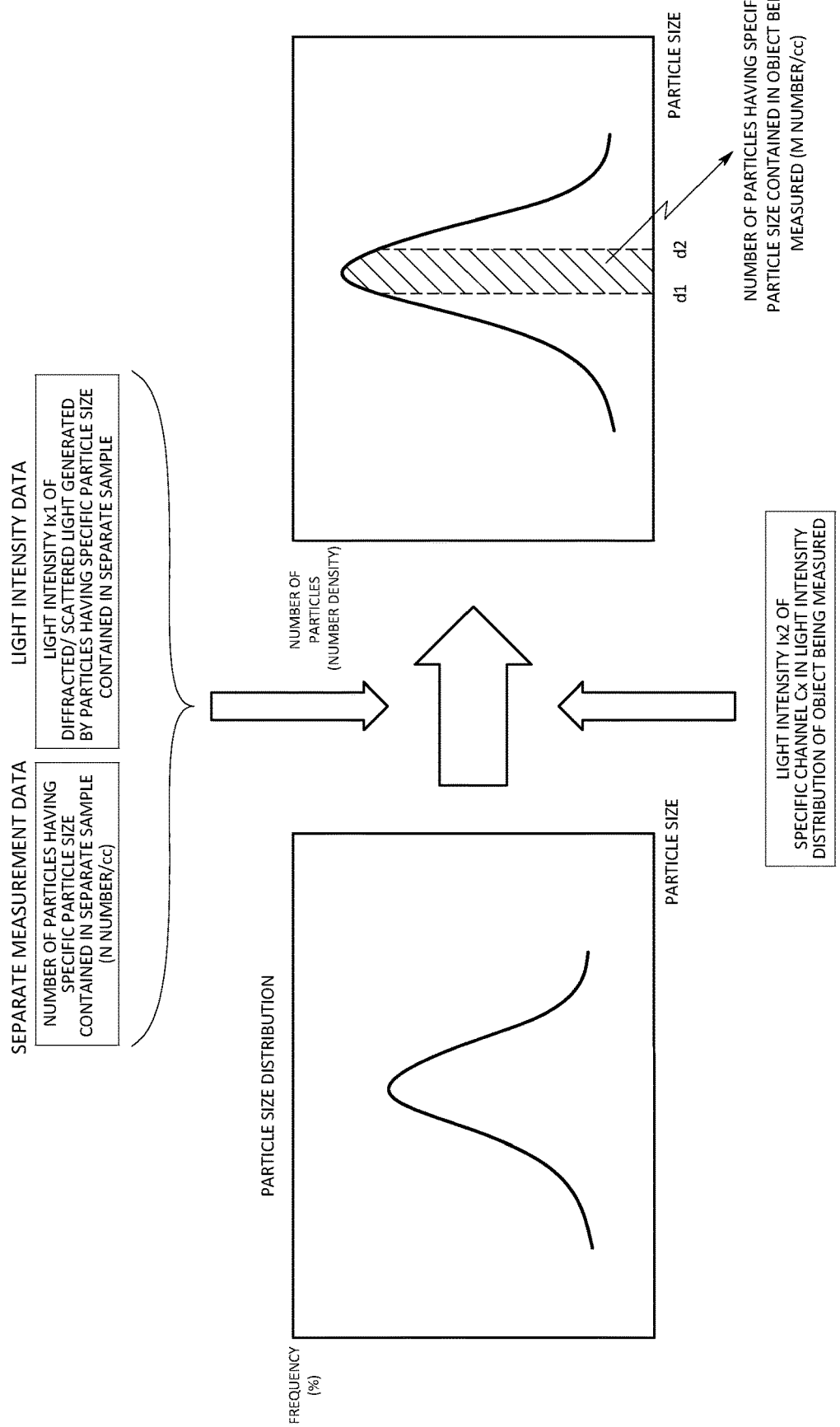
FIG. 4 is a typical view illustrating functions of a distribution conversion unit according to the same embodiment.

As is shown in FIG. 4, based on the separate measurement data and the light intensity data received by the separate measurement data receiving unit 23, the distribution conversion unit 24 converts a particle size distribution calculated by the particle size distribution calculation unit 22 from a distribution in which the number of particles of each particle size contained in the object X being measured are shown in relative terms into a distribution in which the numbers of these particles are shown in absolute terms. Note that the term 'a distribution in which the numbers of particles are shown in absolute terms' means a distribution in which the number of particles shown matches the actual number of particles to the required accuracy (for example, to the same number of digits), and is not restricted to meaning a distribution in which the number of particles shown matches perfectly with the actual number of particles.

More specifically, the distribution conversion unit 24 calculates the number of particles having a specific particle size (i.e., the number density) that are contained in the object X being measured based on the number of particles having a specific particle size that are contained in the separate sample, the light intensity generated by the particles having the specific particle size contained in the separate sample, and the light intensity generated by the particles having the specific particle size contained in the object X being measured.

Next, the distribution conversion unit 24 converts the other axis in a distribution that shows the numbers of particles in relative terms from frequency (i.e., percentage) into particle number (i.e., number density), and transforms the distribution configurations such that the number of particles of this other axis having the specific particle size (i.e., the number density) matches the calculated number of particles having the specific particle size (i.e., the number density).

As a more specific example of this, as is shown in FIG. 4, a case in which the particles having a specific particle size are the particles having specific particle sizes d1 and d2 will now be described. In this case, a number density obtained by separately measuring a specific particle size contained in a separate sample is, for example, N number/cc, and a user inputs this result as the separate measurement data. Additionally, the light intensity generated by the particles having this specific particle size that are contained in the separate sample is Ix1, and the specific channel Cx of the photodetectors 14 detects the light intensity signal that shows this light intensity Ix1. Consequently, the distribution conversion unit 24 multiplies a ratio k=Ix2/Ix1, which is the ratio between the light intensity Ix2 of the specific channel Cx in the light intensity distribution of the object X being measured and the light intensity Ix1, by the number density N number/cc having the specific particle size contained in the separate sample, and thereby calculates a number density M number/cc having the specific particle size contained in the object X being measured. The distribution conversion unit 24 then transforms the distribution configuration such that the surface area of a range where the particle size is between d1 and d2 in the post-transformation particle size distribution is the same as the calculated number density M number/cc.

As a result, a distribution in which the number of particles of each particle size is shown in relative terms is converted into a distribution in which the number of particles of each particle size is shown in absolute terms, and the converted particle size distribution is then output, for example, to a display or the like.

The correlation data storage unit 25 is formed in a predetermined area of the memory, and stores correlation data that shows a correlation between the number of particles having a specific particle size that is obtained by separately measuring a separate sample, and the light intensity generated by the particles having the specific particle size that are contained in the separate sample.

Figure 5:
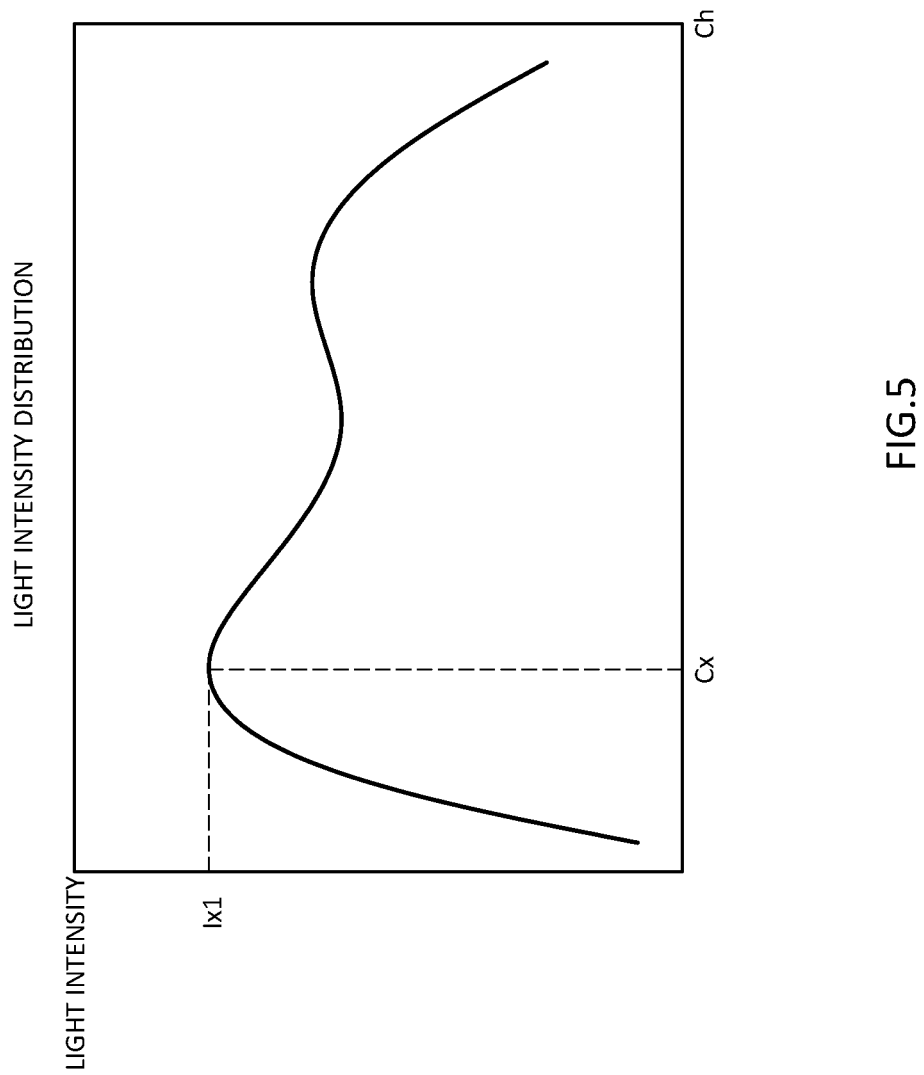
FIG. 5 is a typical view illustrating particle number—light intensity correlation data according to the same embodiment.

In other words, as is shown in FIG. 5, the correlation data storage unit 25 in this case links the number density N number/cc having the specific particle size obtained by separately measuring the separate sample together with the light intensity Ix1 of the specific channel Cx in the light intensity distribution of the separate sample, and stores the result.

If correlation data is stored in this way in the correlation data storage unit 25, then the distribution conversion unit 24 is able to convert a particle size distribution from a distribution in which the number of particles of each particle size is shown in relative terms into a distribution in which the number of particles is shown in absolute terms using the correlation data stored in the correlation data storage unit 25. In other words, if correlation data is stored at least one time in the correlation data storage unit 25, then the above-described distribution conversion can be performed, for example, a plurality of times using that correlation data.

According to the particle size distribution measurement device 100 according to the present embodiment which is formed in the above-described manner, by measuring the number of particles having a specific particle size that are contained in a separate sample from an object being measured, and also measuring the light intensity of the diffracted/scattered light generated by the particles having this specific particle size, it is possible to convert the particle size distribution in the object being measured from a distribution in which the numbers of particles are shown in relative terms to a distribution in which the numbers of these particles are shown in absolute terms. As a result, it is possible to measure easily, and over a wide range, an absolute number of particles contained in an object X being measured without using multiple types of instruments such as optical microscopes and electron microscopes.

Moreover, because the correlation data storage unit 25 stores correlation data that shows a correlation between the number of particles having a specific particle size contained in a separate sample, and the light intensity generated by the particles having this specific particle size, there is no need to make separate measurements each time an object X is measured, and a reduction in the measurement time can be achieved.

Note that the present invention is not limited to the above-described embodiment.

For example, if the refractive index of the object X being measured is different from the retractive index of the separate sample, then it is preferable that the distribution conversion unit 24 converts the particle size distribution of the object being measured from a distribution in which the numbers of particles are shown in relative terms to a distribution in which the numbers of these particles are shown in absolute terms using particle number—light intensity correlation data, the refractive index of the object X being measured, and the refractive index of the separate sample. Hereinafter, the refractive index of the separate sample is taken as n1, while the refractive index of the object X being measured is taken as n2.

Figure 6:
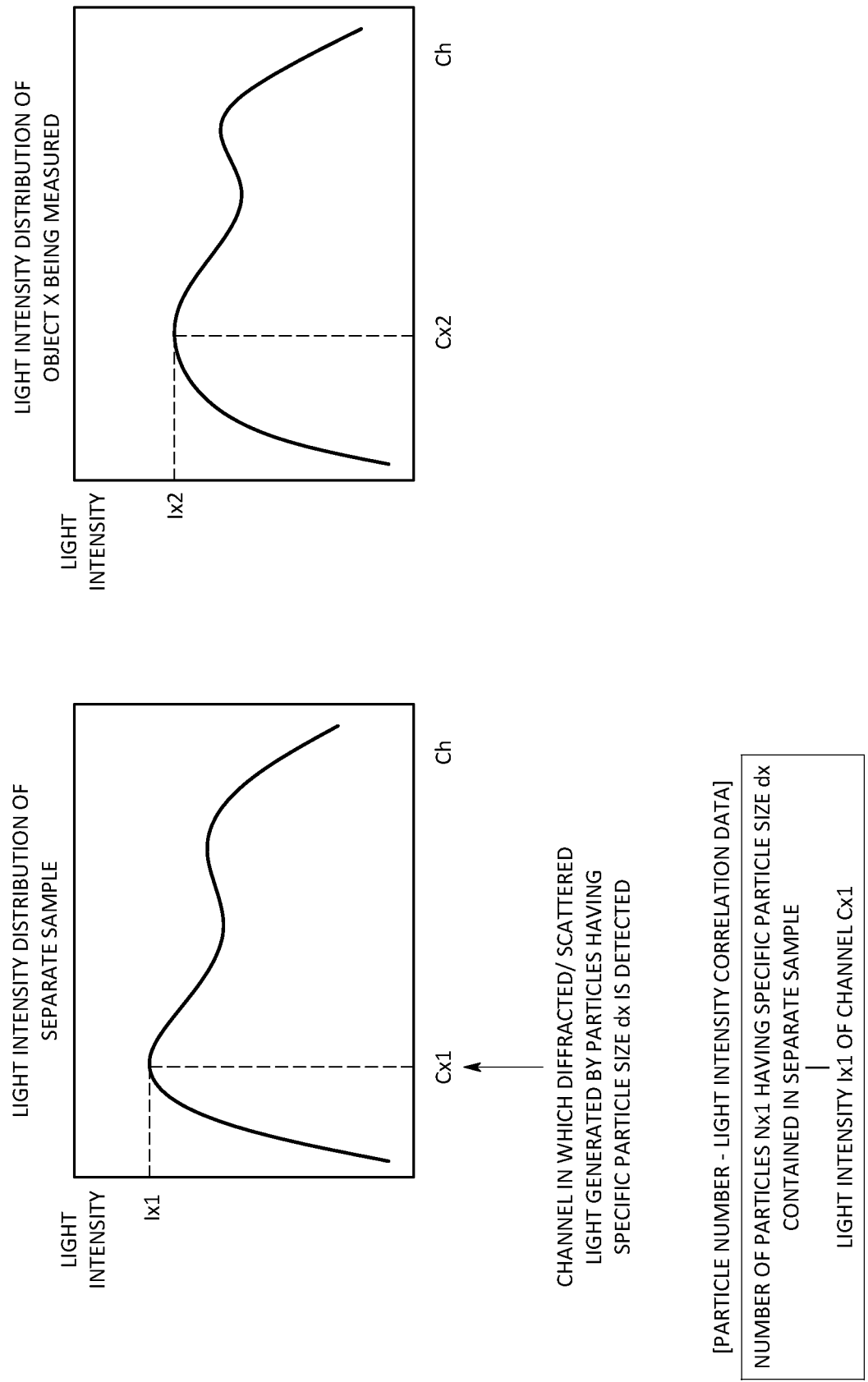
FIG. 6 is a typical view illustrating functions of a distribution conversion unit according to a variant embodiment.

More specifically, firstly, as is shown in FIG. 6, particle number—light intensity correlation data in which a number of particles Nx1 having a specific particle size dx that are contained in a separate sample and a light intensity Ix1 of a specific channel Cx1 in the light intensity distribution of the separate sample are mutually associated with each other is stored in the correlation data storage unit 25.

Next, in the same way as in the above-described embodiment, the distribution conversion unit 24 acquires a light intensity Ix2 of a specific channel in the light intensity distribution of the object X being measured in order to convert the particle size distribution of the object X being measured. At this time, if the refractive index of the object X being measured differs from that of the separate sample, then the specific channels where the diffracted/scattered light generated by the particles having the specific particle size dx is detected are also mutually different. The reason for this is that because the configuration of the ideal light intensity distribution that would be expected to be obtained when light is irradiated onto a particles made up of particles having the specific particle size dx changes depending on the refractive index, for example, the channel corresponding to the peak of that distribution also changes.

Therefore, in this embodiment, as is shown in FIG. 6, the specific channel Cx2 in which the diffracted/scattered light generated by the particles having a specific particle size that are contained in the object X being measured is detected is set to a different channel from the specific channel Cx1 in which the diffracted/scattered light generated by the particles having a specific particle size that are contained in the separate sample is detected, and the distribution conversion unit 24 acquires the light intensity Ix2 of the specific channel Cx2 in the light intensity distribution of the object X being measured.

Figure 7:
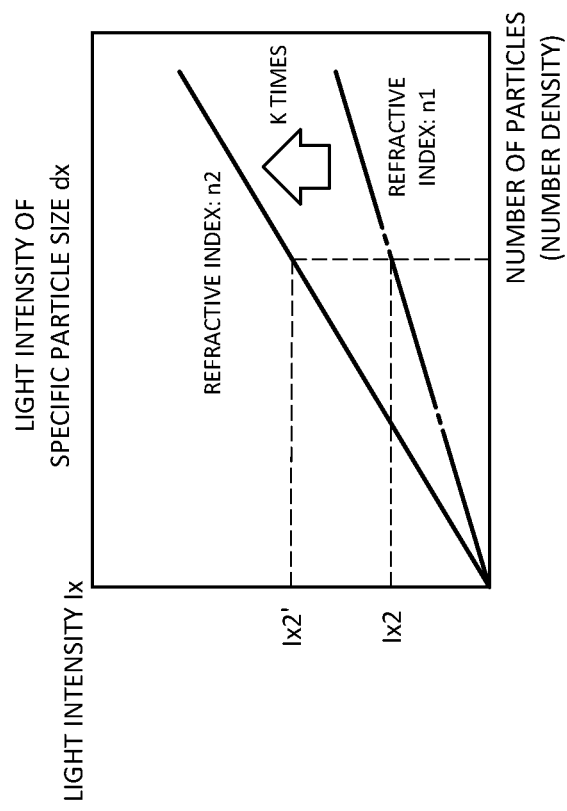
FIG. 7 is a typical view illustrating functions of a distribution conversion unit according to a variant embodiment.

Here, as is shown in FIG. 7, the light intensity Ix of the diffracted/scattered light generated by the specific particle size dx varies in accordance with the refractive index of the particles having the specific particle size dx. Therefore, in order to calculate a light intensity Ix2' of the specific channel Cx2 when it is assumed that n1 is the refractive index of the object X being measured, the distribution conversion unit 24 corrects the light intensity Ix2 based on the refractive index n1 of the separate sample and on the refractive index n2 of the object X being measured.

Here, it is assumed that the post-correction light intensity Ix2' is k times as large as the light intensity Ix2, and, for example, the two methods described below may be used to calculate the post-correction light intensity Ix2'.

(Calculation Method 1)

Using a light intensity I1 of a peak of an ideal light intensity distribution that is obtained by irradiating light onto particles having the specific particle size dx and whose refractive index is n1, and a light intensity I2 of a peak of an ideal light intensity distribution that is obtained by irradiating light onto particles having the specific particle size dx and whose refractive index is n2, the post-correction light intensity Ix2' is calculated as being Ix2'=Ix2·I1/I2.

(Calculation Method 2)

Using a light intensity integrated value S1 of an ideal light intensity distribution that is obtained by irradiating light onto particles having the specific particle size dx and whose refractive index is n1, and a light intensity integrated value S2 of an ideal light intensity distribution that is obtained by irradiating light onto particles having the specific particle size dx and whose refractive index is n2, the post-correction light intensity Ix2' is calculated as being Ix2'=Ix2·S1/S2.

Next, using the light intensity Ix1 and the post-correction light intensity Ix2', the distribution conversion unit 24 calculates the number of particles Nx2 having the specific particle size dx that are contained in the object X being measured as being Nx2=Nx1·Ix2'/Ix1, and in the same way as in the above-described embodiment, using this Nx2, converts the particle size distribution of the object X being measured from a distribution in which the numbers of particles are shown in relative terms to a distribution in which the numbers of particles are shown in absolute terms.

By forming the distribution conversion unit 24 in this way, even if the refractive index of the separate sample and the refractive index of the object X being measured are mutually different from each other, it is still possible by considering these refractive indexes to convert the particle size distribution of the object X being measured into a distribution in which the numbers of particles are shown in absolute terms, and to reduce any difference between the number of particles of each particle size shown by the converted particle size distribution and the actual number of particles. Accordingly, by separately measuring the number of particles having a specific particle size that are contained in a separate sample, and also detecting the light intensity generated by those particles having the specific particle size, for various objects X being measured that have mutually different refractive indexes, it is possible to ascertain absolute numbers of particles contained in each object X being measured.

Moreover, in the above-described embodiment, in order to convert the particle size distribution of an object being measured into a distribution in which the numbers of particles of each particle size are shown in absolute terms, separate measurement data obtained by separately measuring the number of particles having a specific particle size that are contained in a separate sample from the object being measured is used, however, it is also possible to use separate measurement data obtained by separately measuring the number of particles having a specific particle size that are contained in that object being measured.

Figure 8:
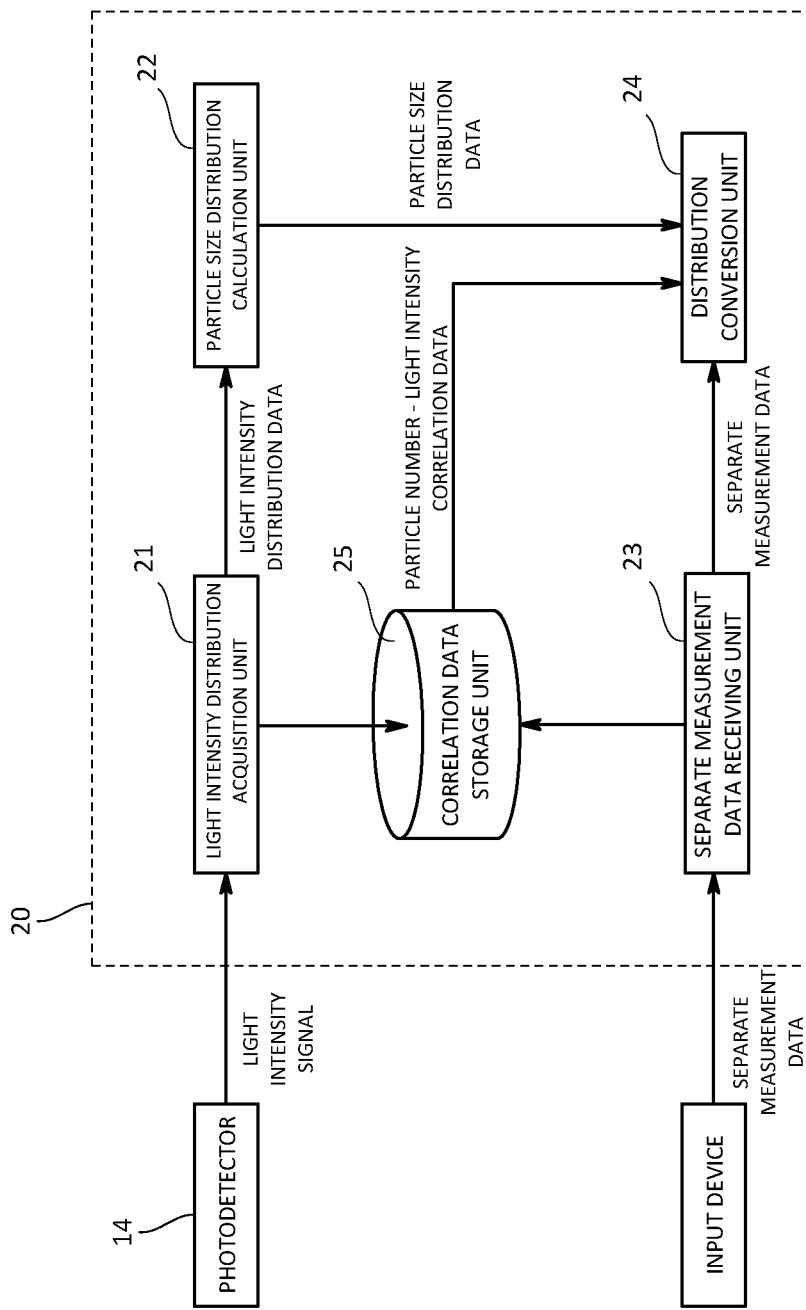
FIG. 8 is a function block diagram showing a function structure of a computation device according to a variant embodiment.

More specifically, as is shown in FIG. 8, the separate measurement data receiving unit 23 receives separate measurement data obtained by separately measuring the number of particles having a specific particle size that are contained in the object X being measured. In the same way as in the above-described embodiment, the separate measurement data shows results obtained when, instead of using the particle size distribution measurement device 100 of the present invention, the number of particles having a specific particle size is separately measured using a separate measurement device, and can be input by a user via, for example, an input device.

Note that the separate measurement referred to here may be performed by measuring the object X being measured that is housed in the cell 11, or by measuring a similar type of object to be measured that has been gathered separately from the object housed in the cell 11.

Based on the separate measurement data received by the separate measurement data receiving unit 23, and on the particle size distribution data calculated by the particle size distribution calculation unit 22, the distribution conversion unit 24 converts a particle size distribution shown by the particle size distribution data from a distribution in which the number of particles of each particle size are shown in relative terms into a distribution in which the number of particles of each particle size are shown in absolute terms.

More specifically, the distribution conversion unit 24 converts the other axis in a distribution that shows the numbers of particles in relative terms from frequency (i.e., percentage) into particle number (i.e., number density), and transforms the distribution configurations such that the number of particles (i.e., the number density) of this other axis for the specific particle size matches the number of particles (i.e., the number density) having the specific particle size obtained as the separate measurement data.

If this type of structure is employed, then by separately measuring the number of particles having a specific particle size that are contained in the object X being measured, it is possible to convert the particle size distribution of the object X being measured from a distribution in which the numbers of particle are shown in relative terms into a distribution in which the number of particles are shown in absolute terms.

In addition to this, compared to the above-described embodiment, the task of converting the particle size distribution of the object X being measured into a distribution in which the numbers of particles are shown in absolute terms is made easier by the elimination of the need to provide a separate sample from the object X being measured.

In contrast, the structure of the above-described embodiment has the advantage that, because a separate sample from the object being measured is used in a separately performed measurement, in cases such as when the object being measured is, for example, extremely expensive, or extremely rare, only a small quantity of the object being measured needs to be consumed.

As is described above, in a structure in which the object X being measured is measured separately, as is shown in FIG. 8, it is preferable for there to be provided the correlation data storage unit 25 that stores particle number—light intensity correlation data that shows a correlation between the light intensity of the diffracted/scattered light generated by the particles having a specific particle size that are detected by irradiating light onto the object X being measured (hereinafter, this may also be referred to as a first object X being measured), and the number of particles having a specific particle size that is obtained by separately measuring this first object X being measured.

In other words, in the light intensity distribution of the first object X being measured, this correlation data storage unit 25 associates the light intensity of the specific channel Cx in which the diffracted/scattered light generated by the particles having the specific wavelength with the number of particles having the specific particle size obtained by separately measuring this first object X being measured, and then stores the results.

Here, a description will be given of a case in which, after the first object X being measured has been measured, a separate object being measured (hereinafter, this may also be referred to as a second object being measured) from this is measured.

In this case, the distribution conversion unit 24 acquires light intensity distribution data obtained by irradiating light onto the second object being measured, and the above-described particle number—light intensity correlation data and, based on these sets of data, converts the particle size distribution of the second object being measured into a distribution in which the numbers of particles are shown in absolute terms. In other words, in this case, without the number of particles having a specific particle size that are contained in the second object being measured having to be measured separately, the particle size distribution of the second object being measured can be converted into a distribution in which the numbers of particles are shown in absolute terms.

The specific method of conversion is similar to that described above except for the separate sample of the above-described embodiment being replaced here with the first object being measured, and the object being measured of the above-described embodiment being replaced with the second object being measured.

Note that, as is described above, the distribution conversion unit 24 may also correct the light intensity based on the refractive index of the first object being measured, and on the refractive index of the second object being measured.

If, in this way, a particle site distribution measurement device is provided with the correlation data storage unit 25, then each time a new object being measured is measured, a reduction in the measurement time is achieved without the number of particles having a specific particle size that are contained in that new object being measured having to be measured separately.

In addition, the present invention may also be applied to what is known as a dynamic light scattering-type particle size distribution measurement device that detects as secondary light the scattered light that is generated when light is irradiated onto an object being measured, and then calculates a particle size distribution based on fluctuations in the light intensity of that scattered light.

Moreover, the present invention may also be applied to what is known as a natural/centrifugal sedimentation-type particle size distribution measurement device that detects as secondary light the transmitted light that is obtained when light is irradiated onto an object being measured, and then calculates a particle size distribution based on changes in the amount of transmitted light.

In addition to these, the present invention is not limited to the above described respective embodiments, and various portions of the structure of each embodiment may also be combined together. Furthermore, various other modifications and the like may be made thereto insofar as they do not depart from the spirit or scope of the present invention.

INDUSTRIAL APPLICABILITY

According to the present invention, it is possible to provide a particle size distribution measurement device that is capable of measuring easily, and over a wide range, an absolute number of particles contained in an object being measured.

What is claimed is:

1. A particle size distribution measurement device that irradiates light onto a particles serving as an object being measured, then detects secondary light generated by this irradiation, and then calculates a particle size distribution of the particles based on the detection data, comprising:
   a separate measurement data receiving unit that receives separate measurement data obtained by separately measuring a number of particles having a specific particle size that are contained in a separate sample from the object being measured, and light intensity data showing a light intensity of the secondary light generated by the particles having the specific particle size that is detected as a result of the light being irradiated onto the separate sample; and
   a distribution conversion unit that, based on the separate measurement data and on the light intensity data, converts the particle size distribution from a distribution in which the numbers of particles of each particle size contained in the object being measured are shown in relative terms to a distribution in which the numbers of these particles are shown in absolute terms.

2. The particle size distribution measurement device according to claim 1, further comprising a correlation data storage unit that stores particle number—light intensity correlation data which shows a correlation between the number of particles shown by the separate measurement data, and the light intensity shown by the light intensity data.

3. The particle size distribution measurement device according to claim 2, wherein
the secondary light is diffracted/scattered light, and
the distribution conversion unit converts the particle size distribution in the object being measured from a distribution in which numbers of particles are shown in relative terms to a distribution in which numbers of particles are shown in absolute terms using the particle number—light intensity correlation data, and using a refractive index of the object being measured and a refractive index of the separate sample.

4. The particle size distribution measurement device according to claim 1, wherein the object being measured is formed by foam particles contained in a liquid.

5. A program medium storing a program for a particle size distribution measurement device that is installed in a particle size distribution measurement device that irradiates light onto a particles serving as an object being measured, then detects secondary light generated by this irradiation, and then calculates a particle size distribution of the particles based on the detection data, wherein
the program causes a computer to perform functions of:
a separate measurement data receiving unit that receives separate measurement data obtained by separately measuring a number of particles having a specific particle size that are contained in a separate sample from the object being measured, and light intensity data showing a light intensity of the secondary light generated by the particles having the specific particle size that is detected as a result of the light being irradiated onto the separate sample; and
a distribution conversion unit that, based on the separate measurement data and on the light intensity data, converts the particle size distribution from a distribution in which the numbers of particles of each particle size contained in the object being measured are shown in relative terms to a distribution in which the numbers of these particles are shown in absolute terms.

6. A particle size distribution measurement device that irradiates light onto a particles serving as an object being measured, then detects secondary light generated by this irradiation, and then calculates a particle size distribution of the particles based on the detection data, comprising:
a separate measurement data receiving unit that receives separate measurement data obtained by separately measuring a number of particles having a specific particle size that are contained in the object being measured; and
a distribution conversion unit that, based on the separate measurement data, converts the particle size distribution from a distribution in which the numbers of particles of each particle size contained in the object being measured are shown in relative terms to a distribution in which the numbers of these particles are shown in absolute terms.

7. A program medium storing a program for a particle size distribution measurement device that is installed in a particle size distribution measurement device that irradiates light onto a particles serving as an object being measured, then detects secondary light generated by this irradiation, and then calculates a particle size distribution of the particles based on the detection data, wherein
the program causes a computer to perform functions of:
a separate measurement data receiving unit that receives separate measurement data obtained by separately measuring a number of particles having a specific particle size that are contained in the object being measured; and
a distribution conversion unit that, based on the separate measurement data and on the light intensity data, converts the particle size distribution from a distribution in which the numbers of particles of each particle size contained in the object being measured are shown in relative terms to a distribution in which the numbers of these particles are shown in absolute terms.

* * * * *